US012772247B2

(12) United States Patent
Yue et al.

(10) Patent No.: US 12,772,247 B2
(45) Date of Patent: Oct. 20, 2026

(54) METHOD AND APPARATUS FOR HANDLING OF SMALL DATA TRANSMISSION

(71) Applicant: Lenovo (Beijing) Limited, Beijing (CN)

(72) Inventors: Ran Yue, Beijing (CN); Haiming Wang, Beijing (CN); Jie Shi, Beijing (CN); Jing Han, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 337 days.

(21) Appl. No.: 18/289,990

(22) PCT Filed: May 10, 2021

(86) PCT No.: PCT/CN2021/092725

§ 371 (c)(1),
(2) Date: Nov. 8, 2023

(87) PCT Pub. No.: WO2022/236564

PCT Pub. Date: Nov. 17, 2022

(65) Prior Publication Data

US 2024/0276498 A1 Aug. 15, 2024

(51) Int. Cl.
*H04W 72/21* (2023.01)
*H04W 76/27* (2018.01)

(52) U.S. Cl.
CPC ........... *H04W 72/21* (2023.01); *H04W 76/27* (2018.02)

(58) Field of Classification Search
CPC ..... H04W 72/21; H04W 76/27; H04W 72/02; H04L 5/001
See application file for complete search history.

(56) References Cited

U.S. PATENT DOCUMENTS 6,775,231 B1 * 8/2004 Baker .................... H04L 47/521 370/230.1
12,335,967 B2 * 6/2025 Jeon ....................... H04W 72/23
12,369,219 B2 * 7/2025 Jeon ....................... H04W 76/27
(Continued)

FOREIGN PATENT DOCUMENTS

CA 3212689 A1 * 9/2022 ............ H04W 74/08
CN 111132328 A 5/2020
(Continued)

OTHER PUBLICATIONS

Panasonic, Handling of subsequent small data transmission in RRC_INACTIVE, Nov. 2020, 3GPP TSG-RAN WG2 Meeting #112 electronic Online, R2-2008935 (Year: 2020).*
Interdigital, Subsequent small data transmission, Apr. 2021, 3GPP RAN WG2 Meeting #113-bise, R2-2103796 (Year: 2021).*
ASUSTek, Discussion on subsequent small data transmission, Nov. 2020, 3GPP TSG-RAN WG2 Meeting #112e, Electronic, R2-2010429 (Year: 2020).*
(Continued)

*Primary Examiner* — Ayaz R Sheikh
*Assistant Examiner* — Tarell A Hampton
(74) *Attorney, Agent, or Firm* — FIG. 1 Patents

(57) ABSTRACT

Methods and apparatuses for handling of small data transmission are disclosed. A method at a user equipment (UE) that is in a non Radio Resource Control (RRC)_CONNECTED state with a network device comprising: determining whether to perform UL carrier selection for non-first SDT data; and transmitting the non-first SDT data to the network device in response to a determining result to perform the UL carrier selection for the non-first SDT data.

16 Claims, 6 Drawing Sheets

(56) References Cited

U.S. PATENT DOCUMENTS

| | | | | |
|---|---|---|---|---|
| 2013/0329577 | A1* | 12/2013 | Suzuki | H04L 49/552 370/252 |
| 2014/0226675 | A1* | 8/2014 | Chrysos | H04L 47/6205 370/412 |
| 2020/0008242 | A1* | 1/2020 | Lee | H04W 74/004 |
| 2020/0305186 | A1* | 9/2020 | Alfarhan | H04W 72/56 |
| 2021/0051732 | A1 | 2/2021 | Choe et al. | |
| 2021/0051734 | A1 | 2/2021 | Chang et al. | |
| 2022/0022266 | A1* | 1/2022 | Agiwal | H04W 74/004 |
| 2022/0095410 | A1* | 3/2022 | Shih | H04B 7/0695 |
| 2022/0117006 | A1* | 4/2022 | Godin | H04W 76/25 |
| 2022/0201659 | A1* | 6/2022 | Agiwal | H04W 72/23 |
| 2022/0210860 | A1* | 6/2022 | Chin | H04W 72/23 |
| 2022/0295540 | A1* | 9/2022 | Tsai | H04W 72/23 |
| 2022/0304100 | A1* | 9/2022 | Tsai | H04W 76/27 |
| 2022/0322419 | A1* | 10/2022 | Jeon | H04W 76/30 |
| 2022/0361276 | A1* | 11/2022 | Jeon | H04W 76/27 |
| 2022/0361277 | A1* | 11/2022 | Tsai | H04W 52/50 |
| 2022/0361278 | A1* | 11/2022 | Tsai | H04W 72/21 |
| 2022/0377800 | A1* | 11/2022 | Chin | H04W 74/0833 |
| 2023/0102755 | A1* | 3/2023 | Xu | H04W 8/02 370/329 |
| 2023/0180223 | A1* | 6/2023 | Tseng | H04W 56/001 370/329 |
| 2023/0380003 | A1* | 11/2023 | Agiwal | H04W 76/27 |
| 2024/0023186 | A1* | 1/2024 | Godin | H04W 76/30 |
| 2024/0155725 | A1* | 5/2024 | Agiwal | H04W 76/27 |
| 2024/0179753 | A1* | 5/2024 | Wu | H04W 74/08 |
| 2024/0224199 | A1* | 7/2024 | Christoffersson | H04W 52/44 |
| 2024/0244703 | A1* | 7/2024 | Tseng | H04B 17/328 |
| 2025/0287351 | A1* | 9/2025 | Christoffersson | H04W 68/005 |

FOREIGN PATENT DOCUMENTS

| | | | | |
|---|---|---|---|---|
| DE | 102021119772 | A1 * | 2/2022 | H04W 76/27 |
| EP | 3989670 | A1 * | 4/2022 | H04W 74/004 |

OTHER PUBLICATIONS

"Extended European Search Report", EP Application No. 21941140. 2, Dec. 19, 2024, 8 pages.

Ericsson, "Common aspects for Sdt", 3GPP TSG-RAN WG2 #113bis-e, R2-2103521, Electronic meeting, Apr. 2021, 4 pages.

Huawei, et al., "Control plane common aspects for SDT", 3GPP TSG-RAN WG2 #113bis-e, R2-2103904, E-meeting, Apr. 2021, 15 pages.

InterDigital , "CG-based SDT selection and configuration", 3GPP RAN WG2 Meeting #113-bise, R2-2103795 [retrieved Dec. 8, 2023]. Retrieved from the Internet <https://www.3gpp.org/ftp/tsg_ran/WG2_RL2/TSGR2_113bis-e/Docs>, Apr. 2021, 4 pages.

Lenovo , et al., "Analysis on open issues of RA based SDT", 3GPP TSG-RAN WG2 Meeting #113 electronic, R2-2101137, E-meeting [retrieved Dec. 8, 2023]. Retrieved from the Internet <https://www.3gpp.org/ftp/tsg_ran/WG2_RL2/TSGR2_113-e/Docs>, Jan. 2021, 2 pages.

Lenovo , et al., "Consideration on CP issues for small data transmission", 3GPP TSG-RAN WG2 Meeting #113bis electronic, R2-2103405, Online [retrieved Dec. 15, 2023]. Retrieved from the Internet <https://www.3gpp.org/ftp/tsg_ran/WG2_RL2/TSGR2_113bis-e/Docs>, Apr. 2021, 6 pages.

PCT/CN2021/092725 , "International Preliminary Report on Patentability", PCT Application No. PCT/CN2021/092725, Nov. 23, 2023, 4 pages.

PCT/CN2021/092725 , "International Search Report and Written Opinion", PCT Application No. PCT/CN2021/092725, Jan. 26, 2022, 7 pages.

Zte Corporation , et al., "Control plane aspects of SDT", 3GPP TSG-RAN2#112e, R2-2009190 [retrieved Dec. 8, 2023]. Retrieved from the Internet <https://www.3gpp.org/ftp/TSG_RAN/WG2_RL2/TSGR2_112-e/Docs>, Nov. 2020, 11 pages.

* cited by examiner

METHOD AND APPARATUS FOR HANDLING OF SMALL DATA TRANSMISSION

FIELD

The subject matter disclosed herein generally relates to wireless communications, and more particularly relates to method and apparatus for handling of small data transmission.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), small data transmission (SDT), Medium Access Control (MAC), MAC control element (MAC CE), radio access network (RAN), timing advance (TA), configured grant (CG), normal UL (NUL), supplementary UL (SUL), random access channel (RACH), Reference Signal Receiving Power (RSRP), Protocol Data Unit (PDU), Downlink Control Information (DCI), Acknowledge (ACK), Negative Acknowledgement (NACK), Downlink Feedback Information (DFI), Transport Block Size (TBS).

There are two RRC states for 4G LTE: RRC_IDLE and RRC_CONNECTED. 5G NR introduces a new RRC state, RRC_INACTIVE. Therefore, in 5G NR, RRC has three distinct states: RRC_IDLE, RRC_CONNECTED and RRC_INACTIVE. The behavior and functions of RRC are governed by the current state of RRC.

RRC_IDLE: Upon power on, UE enters into RRC_IDLE state. UE may move to this state from either RRC_CONNECTED state or RRC_INACTIVE state.

RRC_INACTIVE: UE moves to this state from RRC_CONNECTED state. It is connected but inactive state of UE. In this state, UE maintains RRC connection and at the same time minimizes signaling and power consumption.

RRC_CONNECTED: UE remains in connection with the 5G-RAN/5GC in this state.

RRC states transition process is shown in FIG. 1.

RRC_IDLE to RRC_CONNECTED happens via the RRC Connection Setup procedure. This transition consists of three messages: RRCSetupRequest (UE initiated), RRCSetup, and RRCSetupComplete.

RRC_CONNECTED to RRC_IDLE is via RRC Connection Release procedure with network-initiated RRCRelease message. Upper layers in the UE may also request a release. RRC connection is also released due to radio link failure, handover failure or cell not meeting cell selection criteria.

RRC_CONNECTED to RRC_INACTIVE is network initiated. It is entered via RRCRelease message with suspendConfig IE.

RRC_INACTIVE to RRC_CONNECTED can be triggered by the network via RAN paging. A paged UE will start with RRC Connection Resume procedure consisting of three messages: RRCResumeRequest, RRCResume (or RRCSetup), RRCResumeComplete (or RRCSetupComplete). This procedure can alternatively be initiated by UE for uplink transmission, including RNA update.

RRC_INACTIVE to RRC_IDLE happens when network responds to RRCResume Request with RRCRelease.

The main principle of the RRC_INACTIVE state is that the UE is able to return to the RRC_CONNECTED state as quickly and efficiently as possible. When the UE transforms to RRC_INACTIVE state, both the UE and the RAN store all the information necessary to quickly resume to RRC_CONNECTED state. The message that transforms the UE to RRC_INACTIVE state contains a set of parameters used for RRC_INACTIVE state operation, such as a RAN Notification Area within which the UE is allowed to move without notifying the network. Further, it includes parameters used for secure transition back to the RRC_CONNECTED state, such as a UE identifier and security information needed to support encrypted resume messages.

An UE in RRC_INACTIVE state may initiate a resume procedure when there is a need to transmit data or signaling. In this case, the UE transmits an RRC resume request that includes the UE identifier and a security token to verify the legitimacy of the resume request. After the UE configuration is successfully retrieved, the target node resumes the stored configuration at the UE and applies any necessary modifications, such as the configuration of measurements and the addition or removal of bearers. The respective RRC resume message is integrity protected and encrypted using the security context stored in the network and the UE.

In the RRC_INACTIVE state, the UE is in a power-saving sleep state, but it still retains part of the RAN context (security context, UE capability information, etc.), and can be quickly awakened by a message to transfer from the RRC_INACTIVE state to the RRC_CONNECTED state. NR Release 17 supports direct transmission of small data transmission (SDT) in the RRC_INACTIVE state.

A current SDT procedure is described as follows.

A SDT configuration (e.g. CG based SDT (CG-SDT) configuration) has been configured to the UE when the UE is released to RRC_INACTIVE state. Several CG occasions for SDT (e.g. CG resources) are configured in the CG-SDT configuration. Alternatively, several CG configurations for SDT are configured. When SDT data arrives, the UE initiates the selection between SDT and non-SDT, also between CG-SDT procedure and RACH based SDT (RA-SDT) procedure if SDT is selected. In particular, if CG-SDT criteria are met, UE selects CG-SDT and initiate SDT procedure; else if RA-SDT criteria are met: UE selects RA-SDT and initiate SDT procedure; else, UE initiates non-SDT procedure. CG-SDT criteria are considered met, if 1) available data volume <=data volume threshold and 2) RSRP is greater than or equal to a configured threshold. RA-SDT criteria is considered met, if 1) available data volume <=data volume threshold; 2) RSRP is greater than or equal to a configured threshold; and 3) 4 step RA-SDT resources are configured on the selected UL carrier and criteria to select 4 step RA-SDT is met; or 2 step RA-SDT resources are configured on the selected UL carrier and criteria to select 2 step RA-SDT is met.

Suppose CG-SDT procedure is selected. The UE initiates a CG-SDT procedure in RRC_INACTIVE state. In particular, the UE transmit a first SDT data on a configured CG resource on a selected UL carrier (e.g. normal UL carrier), if the CG resource of one CG occasion is not enough to transmit the whole SDT data (where the first SDT data is a first part of the whole SDT data). In this condition, multiple subsequent UL data transmission as part of the same SDT procedure on dedicated grant has been agreed. After RRCResumeRequest and the first SDT data are received by the network device (e.g. gNB), the non-first SDT data will be transmitted on subsequent configured CG resource(s). The non-first SDT data refers to autonomous transmission of the first SDT data and/or autonomous retransmission of the first SDT data and/or subsequent SDT data. The autonomous transmission means that the UE transmits the data autonomously (without network device (e.g. gNB) scheduling) as a new transmission if the data has failed to be transmitted or has not been transmitted. The autonomous retransmission means the UE transmits the data autonomously (without network device scheduling) as a retransmission if the data has failed to be transmitted or has not been transmitted. The subsequent SDT data means the remaining data of the whole SDT data except for the first or transmitted SDT data, no matter the remaining data is first transmitted, autonomously transmitted or autonomously retransmitted.

In the above description, SDT data is transmitted on SDT resources on a normal UL (NUL) carrier. A supplementary UL (SUL) carrier is introduced as a complement to the NUL carrier. When the SDT data arrives, the UE may initiate carrier selection before SDT and non-SDT selection. A carrier (either SUL carrier or NUL carrier) is selected according to RSRP of the UE.

The SDT data that is transmitted using SDT procedure (e.g. CG-SDT procedure) can be performed on one or more configured SDT resources. That is, a first SDT data (or referred to as initial SDT data) is transmitted on a configured resource. If the SDT data does not complete on the configured source (e.g. the first SDT data is only a part of the whole SDT data), subsequent data (i.e. non-first SDT data, or non-initial SDT data) may be transmitted on subsequent configured SDT resource(s) (e.g. subsequent CG occasion (s)).

On one hand, the transmission of the non-first SDT data is not the first SDT for which the resource selection has been performed. On the other hand, the non-first SDT data transmission could be performed on next CG occasion. We can consider that the non-first SDT data transmission is a CG-SDT. Further, the channel condition could change between two CG occasions because the CG resources may be not close to each other considering the characteristic of SDT. It could lead to different subsequent behaviors by performing the UL carrier selection or not for the non-first SDT data transmission. Therefore, whether to perform the UL carrier selection and the potential SDT resource selection for the non-first SDT data transmission is a problem.

SDT resources (e.g. CG-SDT resources) on different UL carriers can be configured. For example, two CG-SDT resources (e.g. CG #1 and CG #2) are respectively configured on NUL carrier and SUL carrier. If the non-first SDT data transmission is ongoing on CG #1 while new SDT data arrives, when to perform UL carrier selection for the arrived new SDT data is also a problem.

This invention targets solving the above described problems.

BRIEF SUMMARY

Methods and apparatuses for handling of small data transmission are disclosed.

In one embodiment, a method at a user equipment (UE) that is in a non Radio Resource Control (RRC)_CONNECTED state with a network device comprises determining whether to perform UL carrier selection for non-first SDT data; and transmitting the non-first SDT data to the network device, in response to a determining result to perform the UL carrier selection for the non-first SDT data.

In one embodiment, in response to the determining the non-first SDT data is transmitted on the same UL carrier as the first SDT data, the non-first SDT data is transmitted on the same UL carrier.

In another embodiment, in response to the determining the non-first SDT data is transmitted on a different UL carrier from the first SDT data, a resume procedure is initiated. In addition, an indication that indicates a buffer size or TBS of the non-first data PDU or that the PDU is a retransmission PDU is transmitted to the network device.

In some embodiment, the UL carrier selection for the non-first SDT data is triggered when next SDT resource occasion arrives, or alternatively, when previous transmission has been confirmed.

In another embodiment, if new SDT data arrives before the non-first SDT data is transmitted, transmission of the non-first SDT data completes before initiating new SDT procedure for the new SDT data. The new SDT procedure may include UL carrier selection for the new SDT data and/or the selection for SDT or non-SDT In another embodiment, a method at a user equipment (UE) that is in a non Radio Resource Control (RRC)_CONNECTED state with a network device comprises transmitting first SDT data on a UL carrier; and when available resource for transmitting the non-first SDT data changes, initiating a resume procedure.

In yet another embodiment, a user equipment (UE) comprises a transceiver; a memory; and a processor coupled to the transceiver and the memory and configured to: determine whether to perform UL carrier selection for non-first SDT data; and configure the transceiver to transmit the non-first SDT data to a network device, in response to a determining result to perform the UL carrier selection for the non-first SDT data, wherein the UE is in a non Radio Resource Control (RRC)_CONNECTED state with the network device.

In still another embodiment, a user equipment (UE) comprises a transceiver; a memory; and a processor coupled to the transceiver and the memory and configured to: configure the transceiver to transmit first SDT data to a network device on a UL carrier; and initiate a resume procedure when available resource for transmitting the non-first SDT data changes, wherein the UE is in a non Radio Resource Control (RRC)_CONNECTED state with the network device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
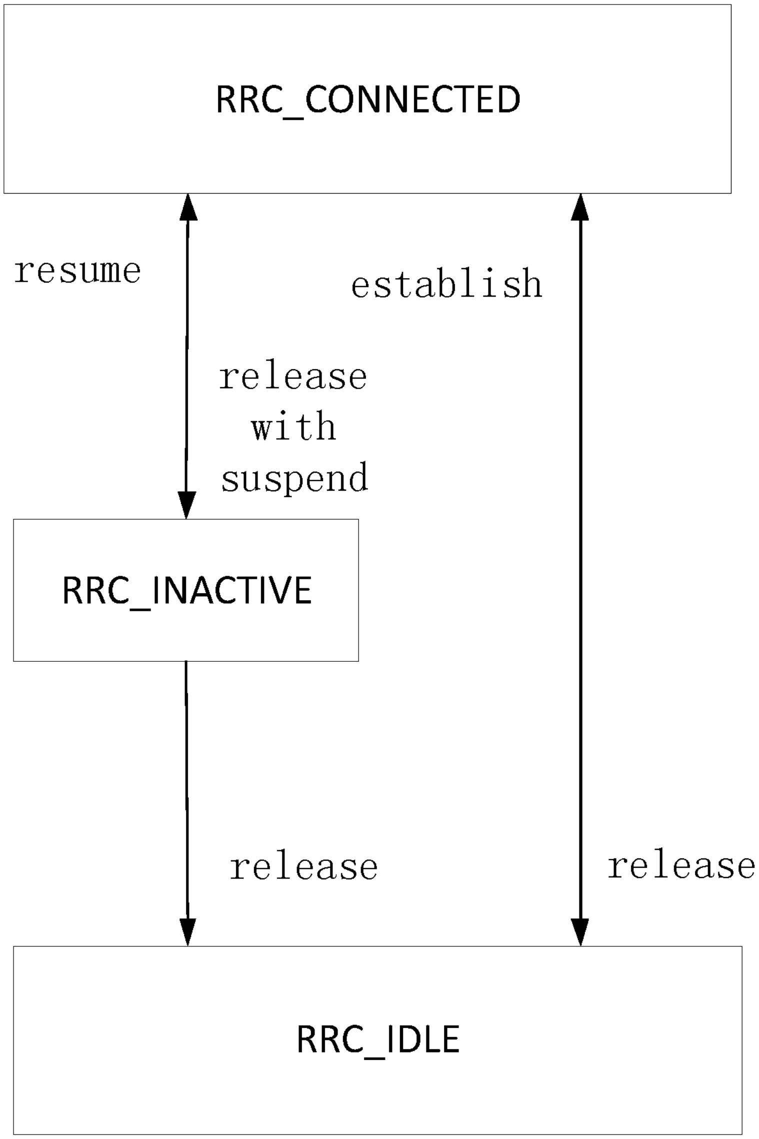
FIG. 1 illustrates RRC states in NR.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including". "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE, 3GPP NR-U, NR Radio Access operating with shared spectrum channel access and so on. It is contemplated that along with the developments of network architectures and new service scenarios, all embodiments in the present application are also applicable to similar technical problems. Moreover, the terminologies recited in the present application may change, which should not affect the principle of the present application. Embodiments of the present disclosure can also be applied to unlicensed spectrum scenario.

As described in the background part, SDT procedure can be CG-SDT procedure or RA-SDT procedure. In the following embodiments, when selection between CG-SDT and RA-SDT is performed, CG-SDT is selected. The present disclosure is not limited to the selection of CG-SDT, it also applies if RA-SDT is selected and performed.

In the following description, first SDT data and non-first SDT data are described. The first SDT data can be alternatively referred to as initial SDT data. The non-first SDT data can be alternatively referred to as non-initial SDT data. The part of SDT data that is transmitted on the first SDT resource (e.g. the CG resource of the first CG occasion) is referred to as the first SDT data. The autonomous transmission of the first SDT data and/or autonomous retransmission of the first SDT data and/or subsequent SDT data (i.e. the SDT data that does not belong to the first SDT data) are referred as the non-first SDT data.

According to a first embodiment, it is not allowed to perform UL carrier selection before the completion of non-first SDT data transmission of which the first small data is transmitted on the configured CG based SDT (CG-SDT) resource.

Figure 2:
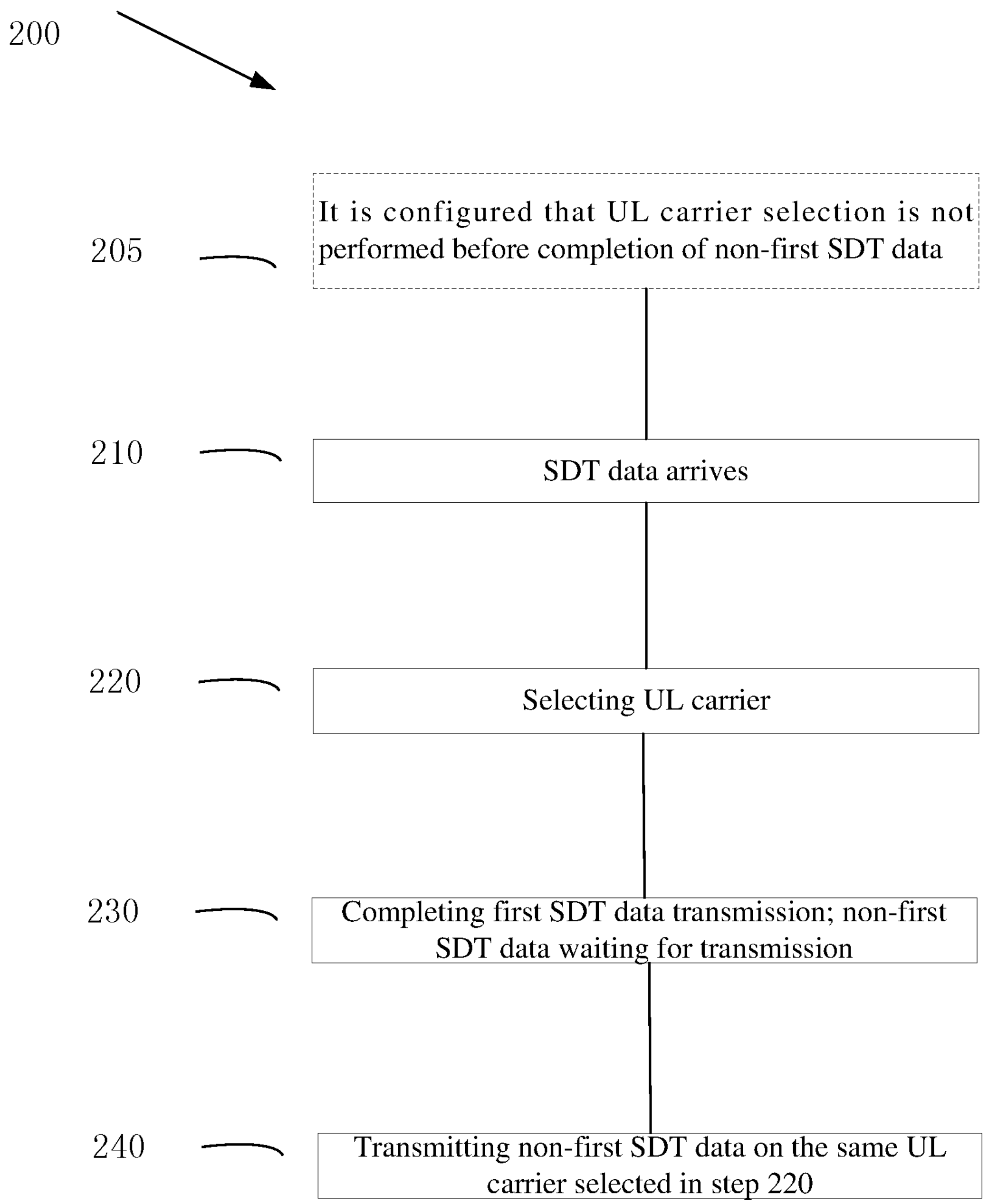
FIG. 2 illustrates a method according to a first embodiment.

An example procedure 200 of the first embodiment is described with reference to FIG. 2. In an optional step 205, UL carrier selection is not performed before completion of the non-first SDT data on the CG-SDT resources. Step 205 can be configured or predefined.

In step 210, new SDT data arrives.

In step 220, a UL (e.g. NUL or SUL) carrier is selected. In addition, CG-SDT criteria are met (i.e. UE would select CG-SDT and initiate SDT procedure).

In step 230, the SDT procedure on CG-SDT resource is initiated. The first SDT data transmission completes. Further, there are non-first SDT data waiting for transmission.

In step 240, the UL carrier selection is not performed before the completion of the non-first SDT data on subsequent CG-SDT resource(s). It means that the non-first SDT data will be transmitted on the UL carrier selected in step 220.

It is not allowed to perform UL carrier selection as long as there is an ongoing CG-SDT (i.e. non-first SDT data waiting for transmission).

It can be seen from the first embodiment that only one UL carrier is selected for one CG-SDT procedure. In other words, UL carrier selection is not performed for the non-first SDT data transmission on CG-SDT resources. The non-first SDT data transmission can only be performed on the same carrier as the first SDT data transmission.

According to a second embodiment, it is allowed to perform UL carrier selection for transmission of each of the non-first SDT data. For example, it can be configured by the network to allow the UE to perform UL carrier selection for transmission of each of the non-first SDT data. In particular, it is allowed to perform UL carrier selection for transmission of each of the non-first SDT data of which the first SDT data transmission is CG-SDT.

When the UL carrier selection for transmission of each of the non-first SDT data is allowed, the transmission of the non-first SDT data may be performed on a different carrier from the carrier on which the first SDT data is transmitted.

When the non-first SDT data is assembled to PDU is an issue. According to the second embodiment, it is up to the UE implementation to decide when the non-first SDT data is assembled to PDU. For example, the non-first SDT data will not be assembled to PDU until the carrier is selected for the non-first SDT data. Alternatively, the UE can determine whether to assemble the non-first SDT data to PDU based on the measured RSRP of the UE (if the UE monitors the RSRP). That is, if the measured RSRP of the UE indicates that the carrier will not be changed, the UE may assemble the non-first SDT data to PDU before the UL carrier is selected. Otherwise, if the measured RSRP of the UE indicates that the carrier will be changed, the UE doesn't assemble the non-first SDT data to PDU until the UL carrier is selected.

Further, if the non-first SDT data has been assembled to PDU before the UL carrier is changed, it is allowed to discard the assembled PDU and re-assemble the SDT data to PDU according to the changed UL carrier.

Figure 3:
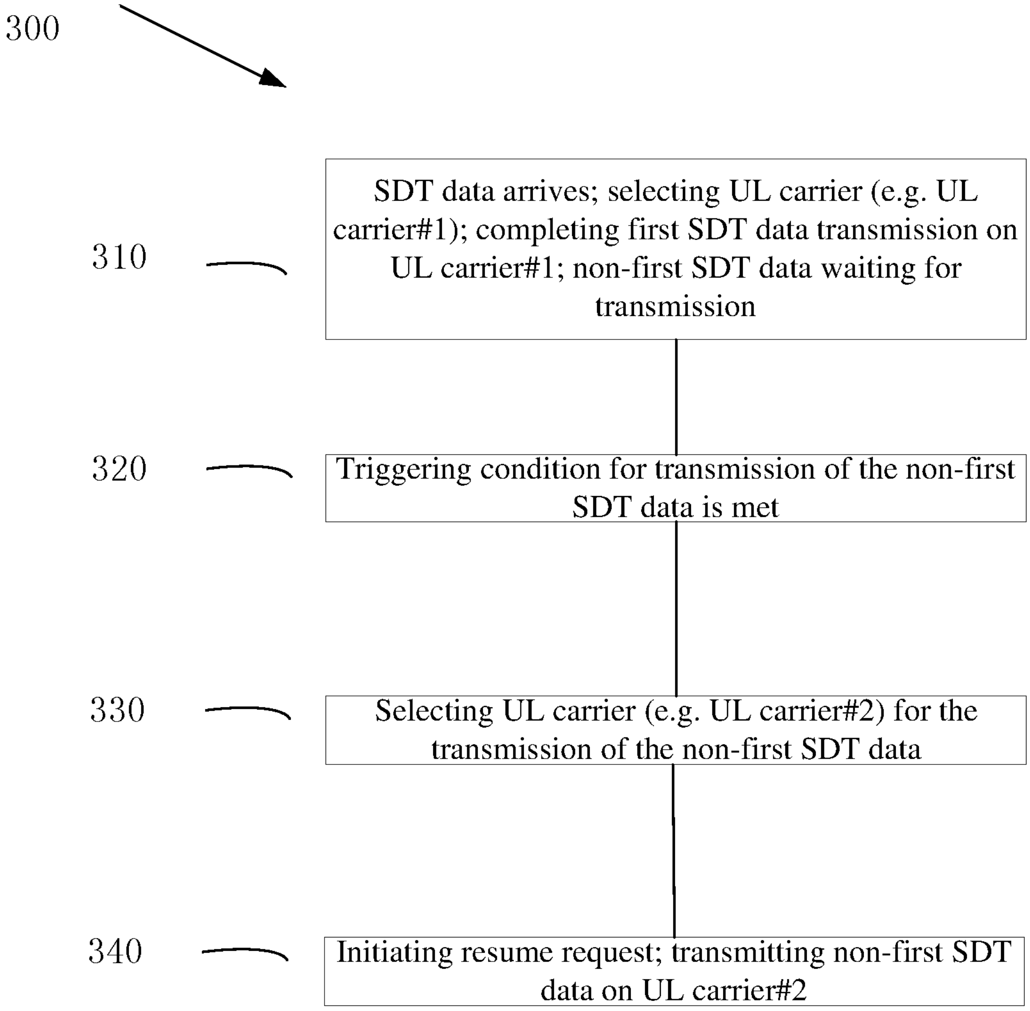
FIG. 3 illustrates a method according to a second embodiment.
Figure 4:
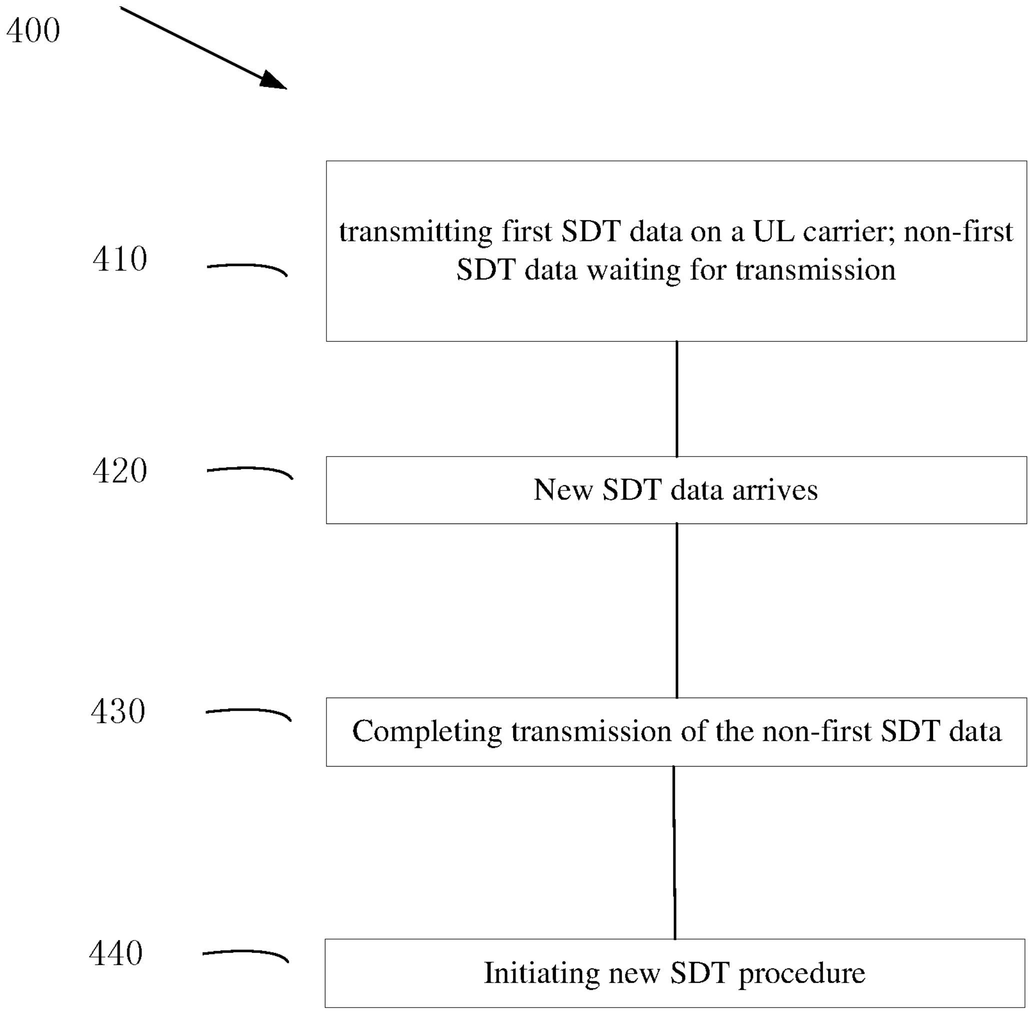
FIG. 4 illustrates a method according to a third embodiment.
Figure 5:
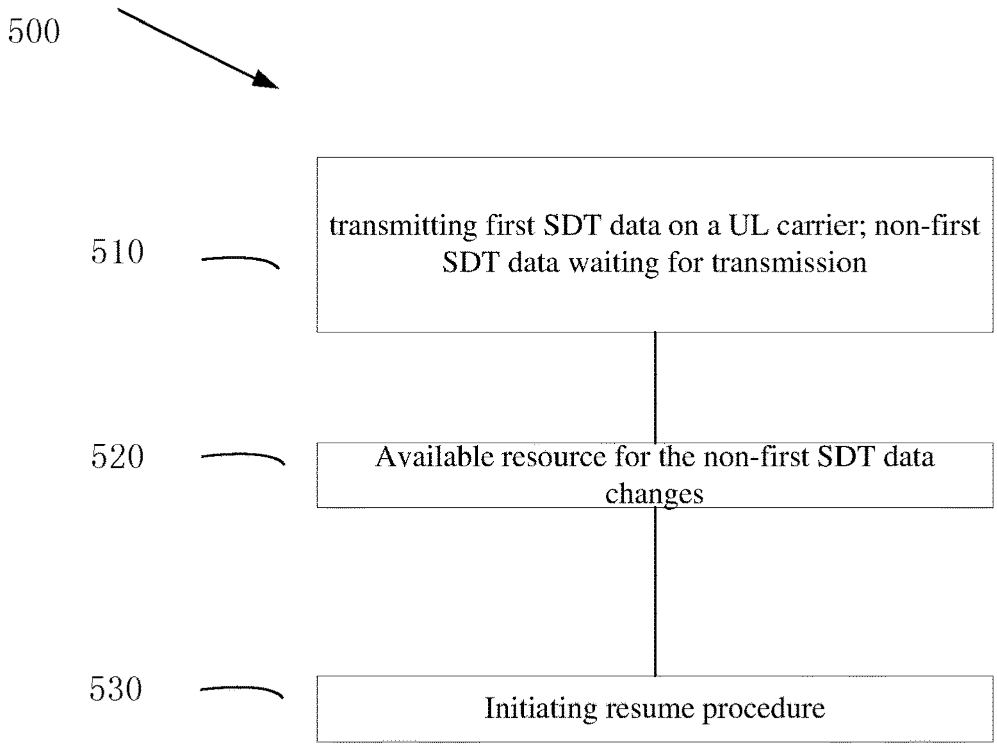
FIG. 5 illustrates a method according to a variety of the third embodiment.

An example procedure 300 of the second embodiment is described with reference to FIG. 3.

It is assumed that the configurations of the CG-SDT resources on the NUL carrier and the SUL carrier are different. For example, UL carrier #1 (e.g. NUL carrier) and UL carrier #2 (e.g. SUL carrier) are respectively configured with different configurations of the CG-SDT resources.

In step 310, when SDT data arrives, UL carrier #1 (e.g. NUL carrier) is selected. In addition, CG-SDT criteria are met. The UE initiates CG-SDT procedure on CG resource(s) on UL carrier #1. That is, a first SDT data transmission is performed on the CG-SDT resource on UL carrier #1. There is non-first SDT data waiting to be transmitted.

In step 320, a triggering condition for transmission of the non-first SDT data is met. The triggering condition can be any of the following conditions:

Condition 1: the next CG-SDT resource occasion arrives.

Condition 2: the first SDT data transmission on UL carrier #1 has been confirmed, including ACK and NACK, cg-RetransmissionTimer and/or configuredGrantTimer expires or a confirmation (e.g. DFI, DCI, RRCRelease, etc) from the network device is received.

Condition 3: the next CG-SDT resource occasion arrives, and the first SDT data transmission on UL carrier #1 has been confirmed (i.e. both Condition 1 and Condition 2 are met).

In step 330, when any of the Conditions in step 320 is met, the UE performs UL carrier selection for the transmission of the non-first SDT data. For example, another UL carrier, i.e. UL carrier #2 (e.g. SUL carrier) is selected.

Incidentally, if the UE implementation can ensure the UL carrier is not changed, the UL carrier selection may not be performed. Accordingly, the same UL carrier, e.g., UL carrier #1, is selected by default. If the same carrier is selected, the non-first SDT data will be still transmitted on the same carrier.

In step 340, the changing or switching of the UL carrier (e.g. from UL carrier #1 to UL carrier #2) triggers the UE to initiate a resume request to the network device. A related indication that indicates the buffer size or TBS of the non-first data PDU or that the PDU is a retransmission PDU can be carried in a resume cause in the resume request. The related indication can be alternatively transmitted to the network device after the UE resumes to RRC_CONNECTED state via a MAC CE or a RRC message or a physical layer message. Optionally, the step 340 can be performed when the criterion for initiating a SDT on the selected UL carrier #2 is satisfied. The criterion can be for example 1) available data volume <=data volume threshold and 2) RSRP is greater than or equal to a configured threshold.

Then, the network device resumes the UE to RRC_CONNECTED state to perform the non-first SDT data transmission on UL carrier #2.

Alternatively, the network device may transmit SDT configuration to the UE and release the UE to RRC_INACTIVE state, so that the UE in RRC_INACTIVE state can perform the non-first SDT data transmission on UL carrier #2.

On the other hand, if the SDT configuration or TBS of the SDT resources on UL carrier #2 is the same as UL carrier #1, the UE in RRC_INACTIVE state may directly performs the non-first SDT data transmission on UL carrier #2.

According to a third embodiment, the UL carrier selection for new SDT procedure is performed after the completion of all SDT data transmission of previous SDT procedure.

In step 410, the UE performs first SDT data transmission on a UL carrier. There are non-first SDT data waiting for transmission.

In step 420, new SDT data arrives.

In step 430, non-first SDT data transmission is performed. New SDT procedure for the newly arrived SDT data is not initiated until the completion of the non-first SDT data transmission.

In step 440, after the transmission of all of the non-first SDT data completes, the new SDT procedure is initiated. The UL carrier selection for the first SDT data of the new SDT procedure is initiated (or performed, or triggered). Further, selection of SDT or non-SDT, and the selection of CG-SDT or RA-SDT are initiated (or performed, or triggered). Accordingly, the transmission of the first SDT data of the new SDT procedure can be performed accordingly.

According a variety of the third embodiment, when the available resource for the non-first SDT data changes, the UE can initiate a resume procedure.

In step 510, the UE performs first SDT data transmission on a UL carrier. There are non-first SDT data waiting for transmission. The step 510 can be implemented for example by steps 210-230.

In step 520, the available resource for the non-first SDT data changes. For example, it could be caused by the UL carrier selection and/or resource selection of the new SDT data arrival or non-first SDT data, or caused by network reconfiguration.

In step 530, the UE initiates a resume procedure. A first indication that indicates the buffer size or TBS of the non-first data PDU or that the PDU is a retransmission PDU can be carried in a resume cause in the resume request. The first indication can be alternatively transmitted to the network device after the UE resumes to RRC_CONNECTED state via a MAC CE or a RRC message or a physical layer message.

In addition, a second indication that indicates the resume procedure being for the transmission of the non-first SDT data can also be carried in a new resume cause (or in an existing resume cause with re-definition) in the resume request. The second indication can be alternatively transmitted to the network device after the UE resumes to RRC_CONNECTED state via a MAC CE or a RRC message or a physical layer message.

After initiating the resume procedure, if the UE receives SDT configuration that is the same as the SDT configuration before available resource change, the UE may maintain in RRC_INACTIVE state and transmit the non-first SDT data. If the UE receives different SDT configuration, the UE may discard the assembled PDU of the non-first SDT data, and re-assemble the non-first SDT data to PDU and transmit the re-assembled PDU. If the UE is resumed to RRC_CONNECTED state, the UE performs the transmission of the non-first SDT data in RRC_CONNECTED state.

In the above embodiments, the UE performs SDT procedure in RRC_INACTIVE state. The present disclosure is not limited to the UE in RRC_INACTIVE state. It is possible that the UE in RRC_IDLE state so long as the UE can perform SDT procedure in RRC_IDLE state. The RRC_INACTIVE state and the RRC_IDLE state can be commonly referred to as non-connected state (e.g. non RRC_CONNECTED state).

Figure 6:
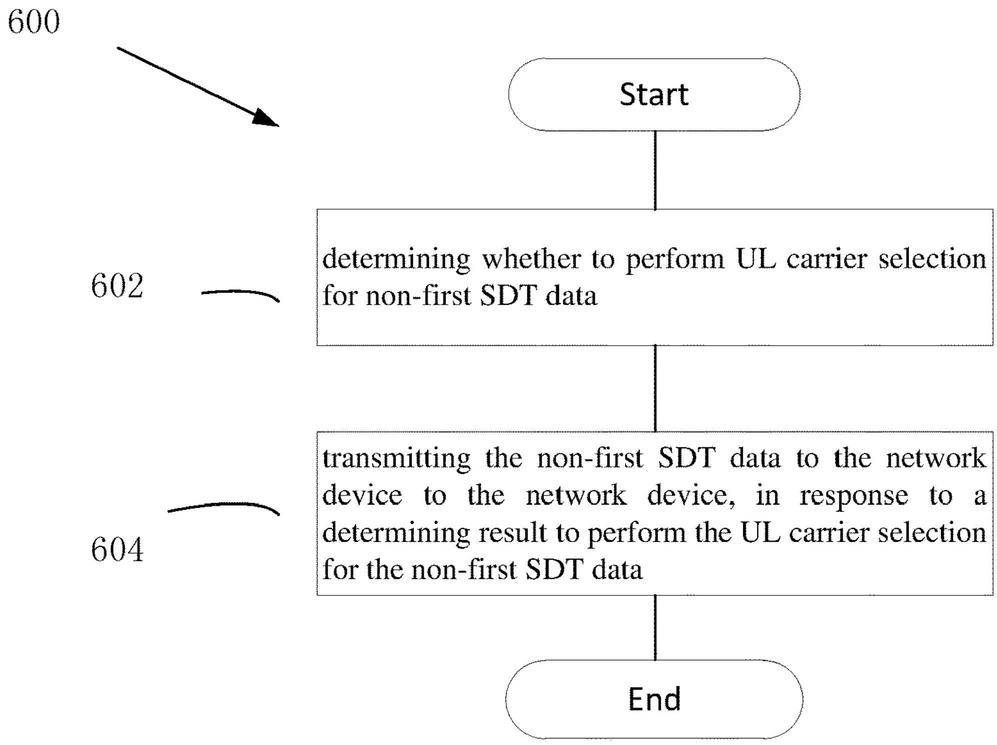
FIG. 6 is a schematic flow chart diagram illustrating an embodiment of a method.

FIG. 6 is a schematic flow chart diagram illustrating an embodiment of a method 600 according to the present application. In some embodiments, the method 600 is performed by an apparatus, such as a remote unit (e.g. UE). In certain embodiments, the method 600 may be performed by a processor executing program code, for example, a microcontroller, a microprocessor, a CPU, a GPU, an auxiliary processing unit, a FPGA, or the like. The UE is in a non Radio Resource Control (RRC)_CONNECTED state with a network device.

The method 600 may include 602 determining whether to perform UL carrier selection for non-first SDT data; and 604 transmitting the non-first SDT data to the network device, in response to a determining result to perform the UL carrier selection for the non-first SDT data.

In response to the determining the non-first SDT data is transmitted on the same UL carrier as the first SDT data, the non-first SDT data is transmitted on the same UL carrier.

In response to the determining the non-first SDT data is transmitted on a different UL carrier from the first SDT data, a resume procedure is initiated. In addition, an indication that indicates a buffer size or TBS of the non-first data PDU or that the PDU is a retransmission PDU is transmitted to the network device.

The UL carrier selection for the non-first SDT data is triggered when next SDT resource occasion arrives, or alternatively, when previous transmission has been confirmed.

If new SDT data arrives before the non-first SDT data is transmitted, transmission of the non-first SDT data completes before initiating new SDT procedure for the new SDT data. The new SDT procedure may include UL carrier selection for the new SDT data and/or the selection for SDT or non-SDT.

Figure 7:
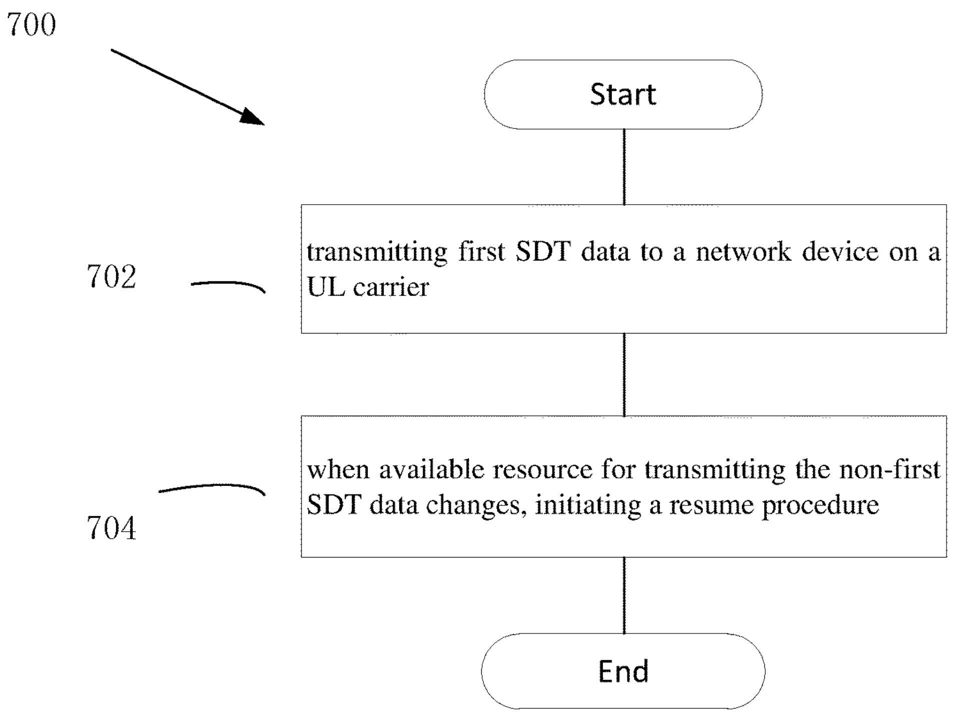
FIG. 7 is a schematic flow chart diagram illustrating another embodiment of a method.

FIG. 7 is a schematic flow chart diagram illustrating an embodiment of a method 700 according to the present application. In some embodiments, the method 700 is performed by an apparatus, such as a remote unit (e.g. UE). In certain embodiments, the method 700 may be performed by a processor executing program code, for example, a microcontroller, a microprocessor, a CPU, a GPU, an auxiliary processing unit, a FPGA, or the like. The UE is in a non Radio Resource Control (RRC)_CONNECTED state with a network device.

The method 700 may include 702 transmitting first SDT data on a UL carrier; and 704 when available resource for transmitting the non-first SDT data changes, initiating a resume procedure.

When the available resource for transmitting the non-first SDT data changes due to new SDT data arrival, the method 700 further comprises completing transmission of the non-first SDT data before initiating new SDT procedure for the new SDT data. Initiating new SDT procedure may comprise: performing UL carrier selection for the new SDT data.

Figure 8:
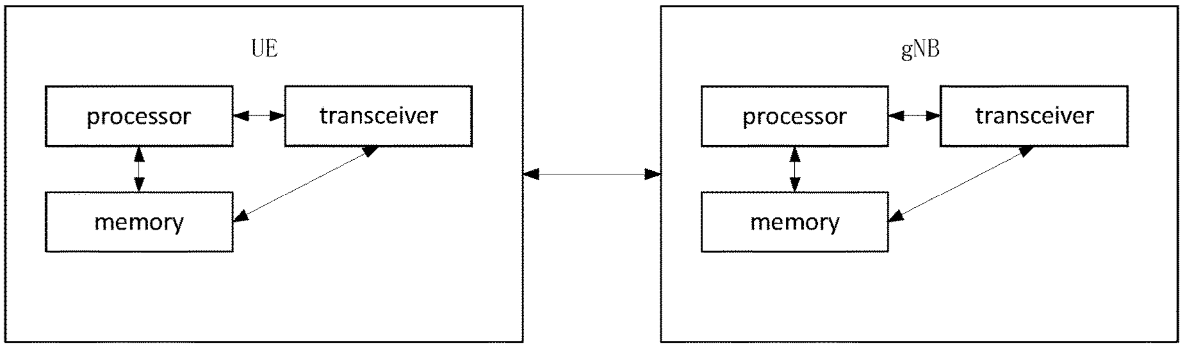
FIG. 8 is a schematic block diagram illustrating apparatuses according to one embodiment.

FIG. 8 is a schematic block diagram illustrating apparatuses according to one embodiment. Referring to FIG. 8, the UE (i.e. the remote unit) includes a processor, a memory, and a transceiver. The processor implements a function, a process, and/or a method which are proposed in FIG. 6 or 7.

The user equipment (UE) comprises a transceiver; a memory; and a processor coupled to the transceiver and the memory and configured to: determine whether to perform UL carrier selection for non-first SDT data; and configure the transceiver to transmit the non-first SDT data to a network device, in response to a determining result to perform the UL carrier selection for the non-first SDT data, wherein the UE is in a non Radio Resource Control (RRC) _CONNECTED state with the network device.

Alternatively, the user equipment (UE) comprises a transceiver; a memory; and a processor coupled to the transceiver and the memory and configured to: configure the transceiver to transmit first SDT data to a network device on a UL carrier; and initiate a resume procedure when available resource for transmitting the non-first SDT data changes, wherein the UE is in a non Radio Resource Control (RRC) CONNECTED state with the network device.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated in the appended claims rather than by the foregoing description. All changes which come within the meaning and range of equivalency of the claims are to be embraced within their scope.

The invention claimed is:

1. A method performed by a user equipment (UE), the UE being in a non Radio Resource Control (RRC)_CONNECTED state with a network device, the method comprising:

transmitting first small data transmission (SDT) data to the network device on an uplink (UL) carrier during a configured grant-based SDT (CG-SDT) procedure; and transmitting, without performing carrier reselection, non-first SDT data to the network device on the UL carrier during the CG-SDT procedure, wherein the non-first SDT data comprises at least one of autonomous transmission of the first SDT data, autonomous retransmission of the first SDT data, or SDT data subsequent to the first SDT data.

2. A user equipment (UE) for wireless communication, comprising:

at least one memory; and at least one processor coupled with the at least one memory and configured to cause the UE to:

transmit first small data transmission (SDT) data to a network device on an uplink (UL) carrier during a configured grant-based SDT (CG-SDT) procedure; and transmit, without performing carrier reselection, non-first SDT data to the network device on the UL carrier during the CG-SDT procedure, wherein the non-first SDT data comprises at least one of autonomous transmission of the first SDT data, autonomous retransmission of the first SDT data, or SDT data subsequent to the first SDT data, and wherein the UE is in a non Radio Resource Control (RRC)_CONNECTED state with the network device.

3. The UE of claim 2, wherein, when new SDT data arrives before the non-first SDT data is transmitted, the at least one processor is configured to cause the UE to complete transmission of the non-first SDT data before initiating a new SDT procedure for the new SDT data.

4. The UE of claim 3, wherein the new SDT procedure includes at least one of UL carrier selection for the new SDT data or a selection between an SDT procedure and a non-SDT procedure for the new SDT data.

5. A processor for wireless communication, comprising:

at least one controller coupled with at least one memory and configured to cause the processor to:

transmit first small data transmission (SDT) data to a network device on an uplink (UL) carrier during a configured grant-based SDT (CG-SDT) procedure; and transmit, without performing carrier reselection, non-first SDT data to the network device on the UL carrier during the CG-SDT procedure, wherein the non-first SDT data comprises at least one of autonomous transmission of the first SDT data, autonomous retransmission of the first SDT data, or SDT data subsequent to the first SDT data, and wherein the processor is in a non Radio Resource Control (RRC)_CONNECTED state with the network device.

6. The processor of claim 5, wherein, when new SDT data arrives before the non-first SDT data is transmitted, the at least one controller is configured to cause the processor to complete transmission of the non-first SDT data before initiating a new SDT procedure for the new SDT data.

7. The processor of claim 6, wherein the new SDT procedure includes at least one of UL carrier selection for the new SDT data and/or or a selection between an SDT procedure and a non-SDT procedure for the new SDT data.

8. The method of claim 1, wherein the first SDT data and the non-first SDT data are transmitted on configured grant (CG) resources configured for the CG-SDT procedure.

9. The method of claim 1, wherein the non-first SDT data is transmitted on a configured grant (CG) occasion subsequent to transmission of the first SDT data.

10. The method of claim 1, wherein the non RRC_CONNECTED state is an RRC-INACTIVE state or an RRC_IDLE state.

11. The UE of claim 2, wherein the first SDT data and the non-first SDT data are transmitted on configured grant (CG) resources configured for the CG-SDT procedure.

12. The UE of claim 2, wherein the non-first SDT data is transmitted on a configured grant (CG) occasion subsequent to transmission of the first SDT data.

13. The UE of claim 2, wherein the non RRC_CONNECTED state is an RRC INACTIVE state or an RRC_IDLE state.

14. The processor of claim 5, wherein the first SDT data and the non-first SDT data are transmitted on configured grant (CG) resources configured for the CG-SDT procedure.

15. The processor of claim 5, wherein the non-first SDT data is transmitted on a configured grant (CG) occasion subsequent to transmission of the first SDT data.

16. The processor of claim 5, wherein the non RRC_CONNECTED state is an RRC_INACTIVE state or an RRC_IDLE state.

* * * * *